(12) United States Patent
Kovaluk et al.

(10) Patent No.: US 9,507,151 B2
(45) Date of Patent: Nov. 29, 2016

(54) OPTICAL DESIGN OF A WIDE FIELD OF VIEW PUPIL FORMING HUD

(71) Applicant: The Boeing Company, Chicago, IL (US)

(72) Inventors: Randall L. Kovaluk, Lake Saint Louis, MO (US); Carl J. Vorst, St. Ann, MO (US); Eric H. Ford, Shadow Hills, CA (US)

(73) Assignee: The Boeing Company, Chicago, IL (US)

( * ) Notice: Subject to any disclaimer, the term of this patent is extended or adjusted under 35 U.S.C. 154(b) by 56 days.

(21) Appl. No.: 14/512,344

(22) Filed: Oct. 10, 2014

(65) Prior Publication Data

US 2016/0103320 A1    Apr. 14, 2016

(51) Int. Cl.
*G09G 5/00*   (2006.01)
*G02B 27/01*  (2006.01)

(52) U.S. Cl.
CPC .................................. *G02B 27/0101* (2013.01)

(58) Field of Classification Search
CPC . G02B 27/0101; G02B 27/01; G02B 27/017
USPC ......... 345/7–9, 29, 30, 38, 44; 359/629–631
See application file for complete search history.

(56) References Cited

U.S. PATENT DOCUMENTS

| | | | |
|---|---|---|---|
| 3,549,803 A | 12/1970 | Becht et al. | |
| 3,885,095 A | 5/1975 | Wolfson et al. | |
| 3,915,548 A | 10/1975 | Opittek et al. | |
| 3,940,204 A | 2/1976 | Withrington | |
| 4,218,111 A | 8/1980 | Withrington et al. | |
| 5,535,025 A * | 7/1996 | Hegg | G02B 27/0172 349/113 |
| 5,692,819 A * | 12/1997 | Mitsutake | F21V 5/048 348/E5.137 |
| 5,907,416 A | 5/1999 | Hegg et al. | |
| 6,612,840 B1 | 9/2003 | Turner | |
| 2013/0100524 A1* | 4/2013 | Magarill | G02B 17/08 359/365 |

* cited by examiner

*Primary Examiner* — Kimnhung Nguyen
(74) *Attorney, Agent, or Firm* — Kolisch Hartwell, P.C.

(57) ABSTRACT

A head up display or HUD system, including methods and apparatus, suitable for use in a flight simulator. According to the present teachings, a flight simulator HUD may be configured to produce a HUD image that appears superimposed on a simulated cockpit field of view image, and which has substantially the same relatively short focal distance from the user as the simulated image. A simulator HUD according to the present teachings does not require any holographic optical elements or an unrealistic cockpit volume, and provides an accurate simulation of conditions in a real aircraft cockpit.

17 Claims, 2 Drawing Sheets

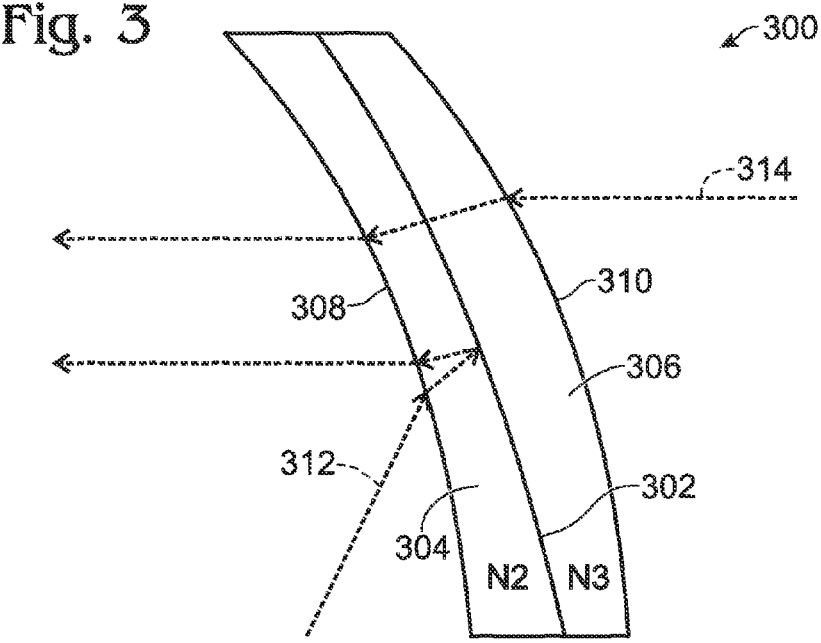
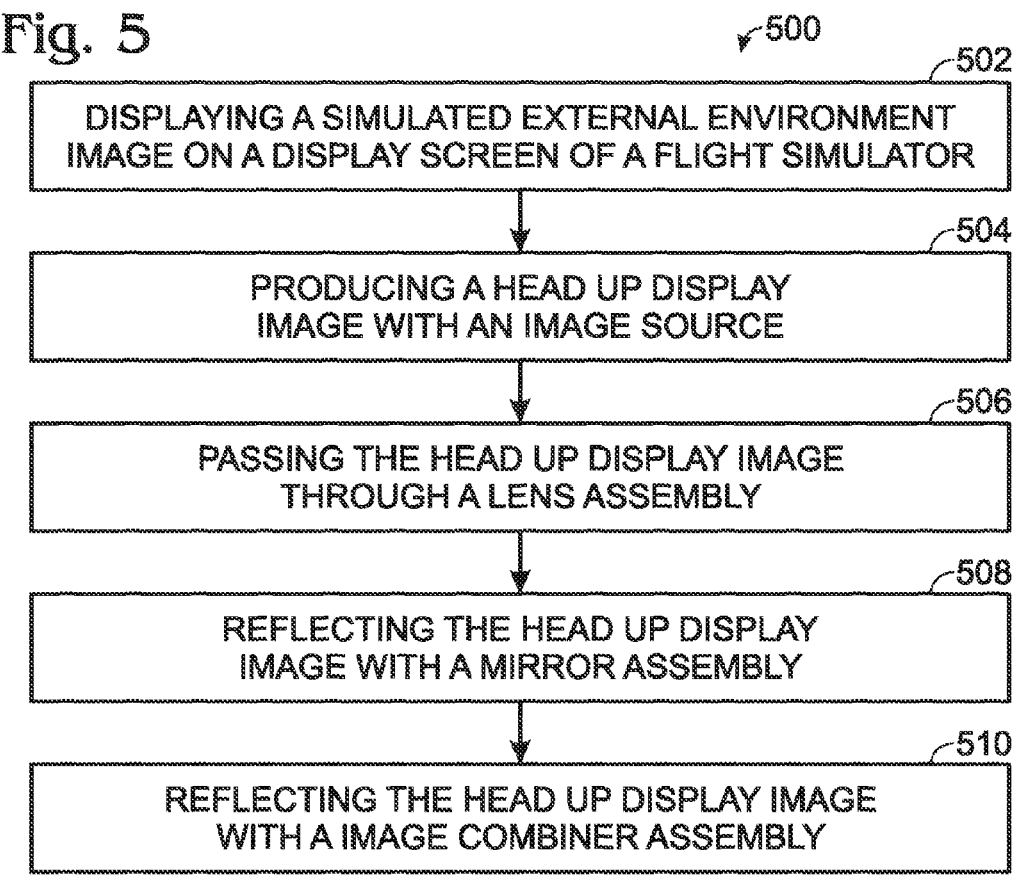

OPTICAL DESIGN OF A WIDE FIELD OF VIEW PUPIL FORMING HUD

CROSS-REFERENCES

The following patents and applications are incorporated herein, in their entireties, for all purposes: U.S. Pat. Nos. 3,549,803, 3,885,095, 3,915,548, 3,940,204, 4,218,111, 5,907,416, and 6,612,840.

FIELD

This disclosure relates to a flight simulator Head Up Display ("HUD"). More specifically, the disclosed embodiments relate to a HUD that is appropriately focused for flight simulator viewing screens and accurately simulates a real aircraft HUD, without requiring holographic optical elements.

BACKGROUND

For various reasons, it may be desirable to simulate a real aircraft flight environment via a flight simulator. A flight simulator may simulate a real aircraft flight environment by exposing a pilot in training to important aviation stimuli that may be present in an actual flight environment, thus allowing the pilot to be trained in aircraft flight conditions without any of the risks inherent in actual flight. As an example, a flight simulator may display a HUD that accurately simulates a real aircraft HUD.

A real aircraft HUD displays flight information to a pilot which is projected or otherwise graphically overlaid upon the pilot's view out the cockpit windshield. As an example, a real aircraft HUD may display geographic information. As another example, a real aircraft HUD may display visual targeting elements, such as aiming reticles that correspond to real out-of-window objects.

A pilot in a real aircraft cockpit typically perceives out-of-window objects at near optical infinity, i.e., the light rays from the objects are parallel when they arrive at the pilot's eye. Accordingly, standard design of a real aircraft HUD usually includes displaying images near optical infinity, thus reducing need for a pilot to refocus while shifting between viewing HUD images and real out-of-window objects. Further, a HUD displaying images near optical infinity may also remove or reduce parallax between HUD images and real out-of-window objects. For example, as a pilot shifts head position, relative position between an out-of-window point and a point in a real aircraft HUD image will remain visually fixed.

A standard real aircraft HUD system usually displays images via an optical combiner glass including a holographic element that projects images within a characteristic field of view ("FOV"). HUD images viewable by a pilot may be limited by the pilot's head position relative to a viewed HUD combiner glass. For example, a pilot may shift head position, either right or left, up or down, to the front or back, far enough to cause part of a HUD image to disappear. In other words, HUD images viewable by a pilot in a real aircraft are dependent on the pilot's head location within what is known as the HUD "viewing volume", which is alternately called the HUD "head box".

A standard flight simulator usually includes a viewing screen that simulates a pilot's view from a real aircraft cockpit, and also may include a HUD. Current flight simulator HUDs are available in various configurations. For example, a flight simulator HUD image may be superimposed onto a viewing screen. As another example, a flight simulator may include a combiner glass in between a viewing screen and a pilot, projecting HUD images at near optical infinity. As yet another example, a reflective HUD includes a reflective combiner glass that reflects HUD images that are sourced from a separate display. Such a HUD display may be distanced from the reflective combiner glass, such that HUD images viewed by a user may have an optical focus distance comparable to a distance between the pilot's eye and the viewing screen.

However, current flight simulator HUD configurations typically do not accurately simulate all of the characteristics of a real aircraft HUD. For example, merely superimposing a HUD image onto a viewing screen may not simulate limitations of the HUD viewing volume, because the pilot in the simulator will see the HUD images from all viewing angles (the pilot's FOV not being limited by the optical combiner as would be the case in a real aircraft). Further, a HUD projecting images near optical infinity may result in unrealistic parallax caused by a pilot's head movement, because the flight simulator screen is typically much closer than the objects would be outside a real aircraft, on the order of 1-2 meters from the pilot. Further still, although a reflective HUD may project images focused at short distances, a reflective HUD may inefficiently add to flight simulator cockpit volume, once packaging options are considered. Even further, a reflective arrangement of this type also generally fails to accurately simulate the limited viewing volume of a real aircraft HUD. Additionally, current flight simulator HUDs typically include holographic elements that are expensive.

For the reasons described above, among others, there exists a need for a flight simulator HUD that accurately simulates HUD images, represents the limitations of a real aircraft HUD viewing volume, is appropriately focused to a viewing screen distance to remove parallax, and does not include holographic elements, while simulating a real cockpit volume.

SUMMARY

The present disclosure relates to a head up display or HUD system, including methods and apparatus, suitable for use in a flight simulator. According to the present teachings, a flight simulator HUD may be configured to produce a HUD image that appears superimposed on a visual scene image such as a simulated cockpit field of view image, and which has substantially the same relatively short focal distance from the user as the visual scene image. A simulator HUD according to the present teachings does not require any holographic optical elements or an unrealistic cockpit volume, and provides an accurate simulation of a HUD that a pilot might encounter in a real aircraft cockpit.

BRIEF DESCRIPTION OF THE DRAWINGS

FIG. 3 is a side view of an image combiner that may be used in a head up display assembly, according to aspects of the present disclosure.

FIG. 5 is a flowchart that illustrates a method of simulating an aircraft cockpit environment, according to aspects of the present disclosure.

DESCRIPTION

Overview

Various embodiments of a flight simulator HUD having an image source, a lens assembly, a mirror assembly, and a combiner assembly are described below and illustrated in the associated drawings. Unless otherwise specified, the disclosed flight simulator HUD and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the disclosed flight simulator HUD may, but are not required to, be included in other similar flight simulator HUDs. The following description of various embodiments is merely exemplary in nature and is in no way intended to limit the invention, its application or uses. Additionally, the advantages provided by the embodiments, as described below, are illustrative in nature and not all embodiments provide the same advantages or the same degree of advantages.

Specific Examples, Major Components, and Alternatives

Figure 1:
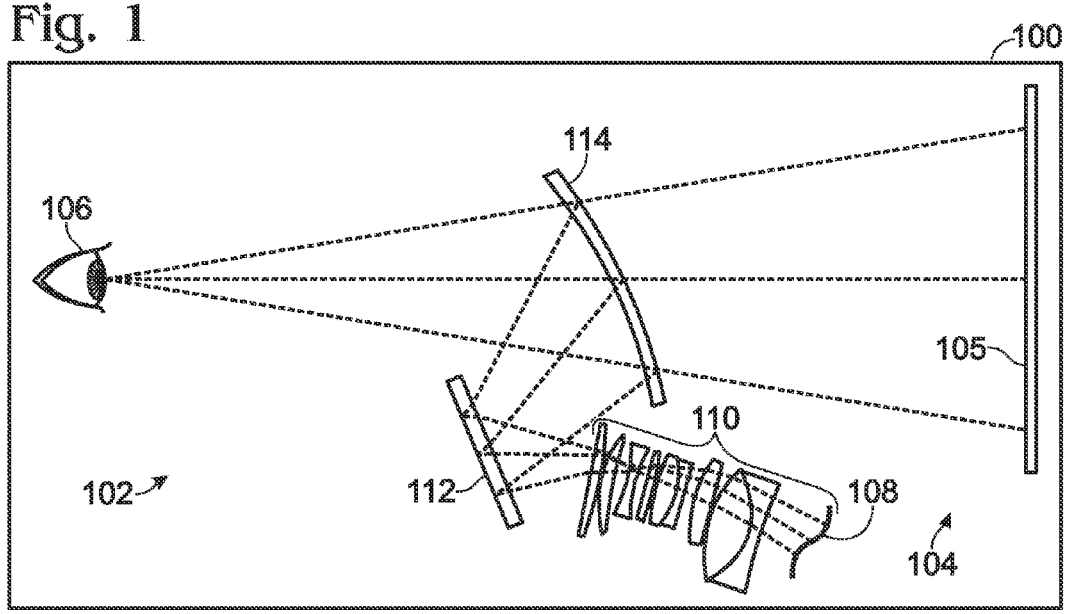
FIG. 1 is a side view depicting various elements of an embodiment of a short focal length head up display assembly, according to aspects of the present disclosure.

FIG. 1 is a side view schematically depicting an embodiment of a flight simulator, indicated by box 100, according to aspects of the present teachings. Flight simulator 100 generally takes the form of a simulated cockpit, within which a trainee pilot may sit to experience simulated flight conditions for training purposes.

Flight simulator 100 includes a simulator HUD, generally indicated at 102, which is configured to generate a simulated HUD image, i.e. to simulate a HUD image that a pilot might view in a real aircraft. Flight simulator 100 also includes a visual system, generally indicated at 104, which generates and displays a visual scene image representing a view that might be seen out the window of a real aircraft cockpit. The HUD image generated by simulator HUD 102 and the visual scene image generated by visual system 104 will be simultaneously viewable by a user of flight simulator 100. Such a user is schematically depicted at 106 in FIG. 1.

Generally speaking, flight simulator 100 provides stimuli to flight simulator user 106 that may be present in an actual flight environment. For example, flight simulator 100 typically simulates a real aircraft cockpit volume. Furthermore, simulator HUD 102 simulates a real aircraft HUD, while visual system 104 simultaneously simulates a real aircraft external environment view by displaying a visual scene image such as a simulated external environment image. The simultaneous display of these images is described in more detail below with reference to FIG. 4.

Simulator HUD 102 includes various components configured to generate a simulated HUD image which is viewable by the user. These components include an image source 108, a relay lens assembly 110, a mirror assembly 112, and an image combiner assembly 114, all of which are described in more detail below.

Image source 108 may produce a HUD image via any method, and may take any form capable of generating an appropriate image. For example, via a high definition cell phone display or any other suitable image display device, such as a cathode ray tube (CRT) display, image source 108 may present a pre-distorted image configured to encounter other components of simulator HUD 102 and ultimately to exit the simulator HUD as a proper or non-distorted rectilinear image viewable by user 106. In some cases, image source 108 may be configured to generate a HUD image at a particular wavelength or narrow range of wavelengths, for reasons described in more detail below. HUD image light generated by image source 108 is indicated by representative light rays in FIGS. 1-3, where the rays are depicted as dashed lines extending from image source 108 toward flight simulator user 106.

Relay lens assembly 110 is configured to receive a HUD image from image source 108 and to provide a first optical correction to the received HUD image. For example, the first correction may provide compensation for specific aberrations related to a non-infinite optical focus associated with the present invention. Relay lens assembly 110 generally includes one or more lenses configured to provide the first optical correction. Further, at least one of the lenses of relay lens assembly 110 may include an anamorphic surface to provide all or a portion of the first correction.

Figure 2:
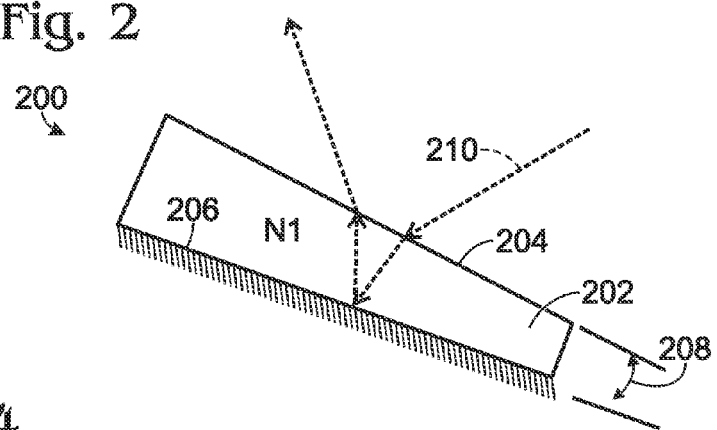
FIG. 2 is a side view of a fold mirror that may be used in a head up display assembly, according to aspects of the present disclosure.

Mirror assembly 112 receives a HUD image from relay lens assembly 110 and provides a second correction to the received HUD image. FIG. 2 schematically depicts a side view of one possible embodiment of mirror assembly 112 in more detail. The mirror assembly embodiment of FIG. 2 includes a fold mirror, generally indicated at 200, which includes a refractive element 202 having a front or outer surface 204 overlying a reflective surface 206. Reflective surface 206 and refractive element 202 may individually and/or collectively correct or compensate for aberrations present optically upstream or downstream.

Outer surface 204 and reflective surface 206 are mutually nonparallel and angled relative to one another by a tilt angle amount indicated at 208. However, outer surface 204 and reflective surface 206 may or may not share a physical vertex. Furthermore, tilt angle amount 208 may be of any magnitude to achieve desired optical correction in accordance with principles of this invention.

Reflective surface 206 may have any suitable shape for obtaining a desired image correction. For example, reflective surface 206 may be anamorphic (i.e., cylindrical) to any desired degree. Similarly, outer surface 204 of the refractive element may have any suitable shape, such as an asphere (i.e., the surface may be aspherical). In some embodiments, outer surface 204 of refractive element 202 may be aspherical and reflective surface 206 may be anamorphic.

Refractive element 202 may be composed of any substantially transparent material with a characteristic index of refraction chosen to provide desired optical transmission properties, as denoted by N1 in FIG. 2, in accordance with principles or embodiments of the invention.

HUD image light, depicted by representative light ray 210, is refracted at the outer surface 204 of refractive element 202 toward reflective surface 206, reflected by reflective surface 206, and refracted once more upon exiting refractive element 202. Although HUD image light is shown in FIG. 1 as interacting with relay lens assembly 110 before interacting with mirror assembly 112, in some cases HUD image light 210 incident on fold mirror 200 may be directly received from HUD image source 108 of FIG. 1, or may encounter optical elements other than those of relay lens assembly 110 before reaching mirror assembly 112.

Image combiner assembly 114, which is a non-holographic combiner, receives HUD image light from mirror assembly 112 and displays the HUD image to flight simulator user 106 in combination with a visual scene image displayed by the visual system 104. For example, the visual scene image may be a simulated cockpit windshield image, or more generally a simulated cockpit field of view image, as described in more detail below with reference to FIG. 4.

FIG. 3 is a side view depicting one possible embodiment of image combiner assembly 114 in more detail. The image combiner assembly embodiment of FIG. 3 includes a non-holographic image combiner, generally indicated at 300, having a selectively reflective surface 302 sandwiched between a first refractive optical element 304 and a second refractive optical element 306. As an example, selectively reflective surface 302 may be parabolic and characterized by a small variation from a sphere, such as 0.001 to 0.01 inches. Further, selectively reflective surface 302 may include a selectively reflective coating bonded to the first and second refractive optical elements 304 and 306.

First and second refractive optical elements 304 and 306 may be constructed, for example, of glass, a transparent polymer, or any other suitable material having desired refractive properties. First refractive optical element 304 and second refractive optical element 306 have respective refractive indices denoted in FIG. 3 by N2 and N3. First refractive optical element 304 and second refractive optical element 306 each may have a spherical outer surface 308 and 310, respectively, such that each outer surface is distal from selectively reflective surface 302 and has a well-defined radius of curvature. The radius of curvature may be the same or different for the two spherical surfaces. For example, the radius curvature of each of the spherical surfaces 308 and 310 may be in the range of 15-25 inches, and in some cases may be approximately 20 inches. However, any suitable radii of curvature may be used in accordance with principles of the present invention.

HUD image light incident on image combiner 300, depicted in FIG. 3 by representative light ray 312, refracts upon entering first refractive optical element 304, reflects off selectively reflective surface 302, and refracts once more upon exiting first refractive optical element 304 such that HUD image light 312 is viewable by flight simulator user 106 of FIG. 1.

Surface 302 may be configured to selectively reflect HUD image light wavelengths while being optically transparent to at least some wavelengths of visible light other than those of the HUD image light. For example, surface 302 may be reflective to a particular wavelength or range of wavelengths produced by HUD image source 108, as depicted in FIG. 3 by the reflection of representative light ray 312 generated by the HUD image source, and optically transparent to visible light wavelengths produced by visual system 104, depicted in FIG. 3 by the transmission of representative light ray 314 generated by the visual system.

For instance, HUD image light wavelengths may be in an optically insignificant range of normal visible wavelengths displayed by visual system 104, such that selectively reflective surface 302 allows user 106 to view images displayed by visual system 104 without significant attenuation. Alternatively or in addition, surface 302 may be a partially silvered surface or the like, which is configured to reflect light (such as HUD image light 312) reaching the surface from one side, while transmitting light (such as visual scene image light 314) reaching the surface from the other side.

As depicted in FIG. 3, visual scene image light 314 produced by visual system 104 may be incident on image combiner 300. Light 314 may refract at outer surface 310 of second refractive optical element 306, substantially pass through selectively reflective surface 302, and refract once more upon passing through outer surface 308 of first refractive optical element 304. The visual scene image light will then be viewable by flight simulator user 106 of FIG. 1.

In some cases, indices of refraction N2 and N3 may be substantially equal such that visual scene image light 314 does not refract at the interface of first refractive optical element 304 and second refractive optical element 306, as FIG. 3 depicts. However, N2 and N3 may have any values. If the indices of refraction of refractive optical elements 304 and 306 are different, visual scene image light 314 (other than rays perpendicular to surface 302) will also refract when passing from one of the refractive elements to the other.

In any case, HUD image light 312 and visual scene image light 314 will be concurrently visible to flight simulator user 106, as a virtual image and a real image presented within the viewer's field of view, respectively. In other words, the HUD image represented by light ray 312 is combined with a visual scene image represented by light ray 314, such as a simulated cockpit field of view image, into a combined image that is viewable by flight simulator user 106. Furthermore, the angles of refraction of visual scene image light 314 at spherical surfaces 308 and 310 may be substantially equivalent, allowing flight simulator user 106 to view the combined images displayed with minimal distortion.

Image combiner assembly 114, for example including non-holographic image combiner 300, allows a HUD image and a visual scene image to be generated with substantially the same focal length, i.e. to be in focus at the same (relatively short) distance from the viewer, as depicted in FIG. 1. Specifically, both the virtual HUD image and the real (but simulated) visual scene image can be generated to be in focus at a display screen 105 of visual system 104. Therefore, flight simulator user 106 will perceive HUD images overlaid upon a simulated visual scene image, without needing to shift focus when shifting attention between the images. This is desirable because it accurately recreates a feature of a real aircraft HUD. Appropriate focal length for a flight simulator may be 0.5 to 2.0 meters, for example. However, any focal length may be used.

Figure 4:
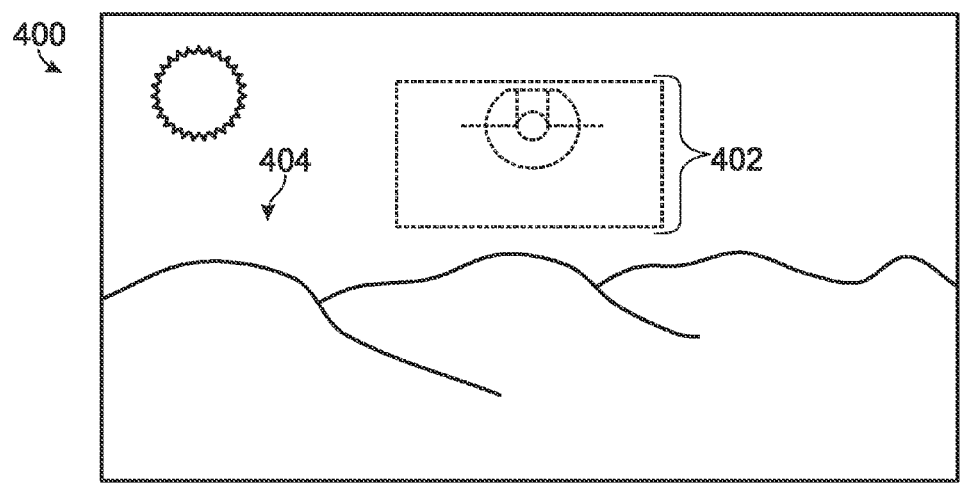
FIG. 4 is a view of a flight simulator screen from a user perspective, according to aspects of the present disclosure.

FIG. 4 illustrates a forward-looking view, generally indicated at 400, as seen from the perspective of flight simulator user 106, in accordance with aspects of the current teachings. A virtual HUD image 402 displayed by non-holographic image combiner assembly 114 and viewable by flight simulator user 106 is shown in dashed lines. HUD image 402 may be a static image or a plurality of images in sequence, such as a video or animation. HUD image 402 is in focus at the position of display screen 105 of visual system 104, which displays as a real image a simulated external environment image or visual scene image, generally indicated at 404.

If flight simulator user 106 shifts head position, relative position between a point in HUD image 402 and simulated external environment image 404 will remain visually fixed. Therefore, the present invention provides proper simulation of real aircraft visual stimuli, such as HUD images that are perceived as dependent on a pilot's FOV with minimal parallax between HUD image elements and a flight simulator visual system display.

FIG. 5 is a flow chart depicting an exemplary method, generally indicated at 500, of simulating an aircraft cockpit environment, according to aspects of the present disclosure. At step 502, method 500 includes displaying a simulated external environment image, also referred to as a visual scene image, on a display screen of a flight simulator. For example, as described previously, step 502 may include displaying a simulated cockpit windshield or field of view image on a screen such as that presented by visual system 104 of simulator 100.

At step 504, method 500 includes producing a head up display image with an image source, such as image source 108 described above, which in some cases may be a high definition cell phone display.

At step 506, method 500 includes passing the head up display image through a lens assembly, such as relay lens assembly 110 described above, to provide a first correction to the head up display image.

At step 508, method 500 includes reflecting the head up display image with a mirror assembly, such as mirror assembly 112 described above, to provide a second correction to the head up display image.

At step 510, method 500 includes reflecting the head up display image with an image combiner assembly, such as non-holographic combiner assembly 114 described above, so that a user of the flight simulator will see the head up display image overlaid upon the visual scene image. According to aspects of the present teachings, the head up display image and the visual scene image will both be in focus at the same distance from the user, typically at the position of the display screen.

In some cases, the steps of method 500 may be performed in a different order than the order described above. In addition, according to the present teachings, one or more steps may be omitted from or added to the steps of method 500 described above.

In summary, the present teachings relate to a short focal length HUD that overcomes various problems with previously know simulator HUDs. In particular, the present teachings provide for the generation of HUD images in a flight simulator that are suitably dependent on a HUD viewing volume and are appropriately focused to a flight simulator viewing screen distance, without requiring holographic elements. Further, embodiments of the HUD generating system described above allow for simulation of a real cockpit volume, unlike some other HUD configurations.

We claim:

1. A head up display for use with a flight simulator visual system, comprising:
   an image source configured to produce a head up display image;
   a relay lens assembly configured to receive the head up display image from the image source and to provide a first correction to the head up display image;
   a mirror assembly configured to receive the head up display image from the relay lens assembly and to provide a second correction to the head up display image; and
   a non-holographic combiner assembly configured to receive the head up display image from the mirror assembly and to display the head up display image to a flight simulator user in combination with a simulated cockpit field of view image;
   wherein the mirror assembly includes a fold mirror having a refractive element overlying a reflective surface, and wherein an outer surface of the refractive element and the reflective surface are nonparallel by a tilt angle amount.

2. The head up display of claim 1, wherein the outer surface of the refractive element is an asphere and the reflective surface is anamorphic.

3. The head up display of claim 1, wherein the combiner assembly includes a parabolic reflector.

4. The head up display of claim 3, wherein the parabolic reflector is disposed between a pair of refractive elements each having a spherical surface distal from the reflector.

5. The head up display of claim 1, wherein the combiner assembly includes a parabolic reflective surface sandwiched between two refractive optical elements.

6. The head up display of claim 1, wherein the image source is a cell phone display.

7. A method of simulating an aircraft cockpit environment, comprising:
   displaying a simulated external environment image on a display screen of a flight simulator;
   producing a head up display image with an image source;
   passing the head up display image through a relay lens assembly;
   reflecting the head up display image with a fold mirror assembly; and
   reflecting the head up display image with a non-holographic image combiner assembly so that a user of the flight simulator will see the head up display image overlaid upon the simulated external environment image;
   wherein the fold mirror assembly includes a refractive element overlying a reflective surface, and wherein an outer surface of the refractive element is oriented nonparallel to the reflective surface.

8. The method of claim 7, wherein the outer surface is an asphere and the reflective surface is anamorphic.

9. The method of claim 7, wherein the combiner assembly includes a parabolic reflector disposed between two refracting elements.

10. The method of claim 9, wherein the two refracting elements each have a spherical outer surface and a parabolic inner surface.

11. The method of claim 10, wherein the spherical outer surfaces each has a radius of curvature in the range of 15-25 inches.

12. The method of claim 7, wherein the image source is a cell phone display.

13. A short focal length head up display assembly, comprising:
   an image source configured to produce a head up display image;
   a lens assembly including at least one anamorphic surface configured to provide a first correction to the head up display image;
   a mirror assembly including an anamorphic reflecting surface configured to provide a second correction to the head up display image; and
   a non-holographic image combiner including a parabolic reflector sandwiched between two refractive elements;
   wherein the image combiner is configured to combine the head up display image with a simulated windshield image into a combined image, and to display the combined image to a simulator user; and
   wherein the head up display image has substantially the same focal length as the simulated windshield image in the combined image.

14. The head up display assembly of claim 13, wherein the focal length is between 0.5 and 2.0 meters.

15. The head up display assembly of claim 13, wherein the mirror assembly further includes a refractive element having an ashperical outer surface.

16. The head up display assembly of claim 13, wherein the image source is a cell phone display.

17. The head up display assembly of claim 13, wherein the two refractive elements of the image combiner each have a spherical outer surface and a parabolic inner surface.

* * * * *